United States Patent
Ginsburg et al.

(10) Patent No.: US 11,057,860 B2
(45) Date of Patent: Jul. 6, 2021

(54) NETWORK ENTITIES, A WIRELESS COMMUNICATION SYSTEM AND A METHOD FOR COLLECTING DATA FOR MULTIPLE MOBILE NETWORK OPERATORS

(71) Applicants: ip.access Limited, Cambridge (GB); Neil Ginsburg, Newbury (GB); James Harrow, Fulbourn (GB)

(72) Inventors: Neil Ginsburg, Newbury (GB); James Harrow, Fulbourn (GB)

(73) Assignee: ip.access Limited, Cambridge (GB)

( * ) Notice: Subject to any disclaimer, the term of this patent is extended or adjusted under 35 U.S.C. 154(b) by 128 days.

(21) Appl. No.: 16/331,637

(22) PCT Filed: Sep. 1, 2017

(86) PCT No.: PCT/EP2017/071980
§ 371 (c)(1),
(2) Date: Mar. 8, 2019

(87) PCT Pub. No.: WO2018/046402
PCT Pub. Date: Mar. 15, 2018

(65) Prior Publication Data
US 2019/0364534 A1    Nov. 28, 2019

(30) Foreign Application Priority Data
Sep. 8, 2016  (GB) .................................... 1615269

(51) Int. Cl.
*H04W 64/00* (2009.01)
*H04W 76/11* (2018.01)
(Continued)

(52) U.S. Cl.
CPC ......... *H04W 64/003* (2013.01); *H04W 48/10* (2013.01); *H04W 72/0466* (2013.01); *H04W 76/11* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 6,950,663 B2* | 9/2005 | Pihl ........................... | G01S 5/10 342/450 |
| 7,496,066 B2* | 2/2009 | Speltacker .............. | H04W 8/12 370/328 |

(Continued)

FOREIGN PATENT DOCUMENTS

| | | | |
|---|---|---|---|
| EP | 2182752 A1 | 5/2010 | |
| EP | 2957922 A1 | 12/2015 | |

(Continued)

OTHER PUBLICATIONS

Caroline Gabriel: "Client Confidential Copyright Maravedis-Rethink 2014", Jun. 16, 2014 (Jun. 16, 2014), pp. 1-17, XP055416204, Retrieved from the Internet: URL:http://www.ipaccess.com/uploads/wysiwy g editor/files/Maravedis and ip access webinar slides.pdf [retrieved on Oct. 17, 2017] slides 10, 12, 13.

(Continued)

*Primary Examiner* — Gregory B Sefcheck
(74) *Attorney, Agent, or Firm* — Optimus Patents US, LLC (57) ABSTRACT

A method for at least one service provider to collect wireless communication unit location related data for multiple mobile network operators, MNOs. The method comprises, at a base station supporting multiple MNOs: broadcasting on a first frequency only a first public land mobile network identifier, PLMN-ID, of a first MNO at a first instant in time for detection by first wireless communication units associ- (Continued)

ated with the first MNO; receiving location related information from the first wireless communication units associated with the first MNO in response to the broadcast first PLMN-ID; broadcasting on a second frequency only a second PLMN-ID of a second MNO, at a second instant in time for detection by second wireless communication units associated with the second MNO; and receiving location related information from the second wireless communication units associated with the second MNO in response to the broadcast second PLMN-ID.

18 Claims, 6 Drawing Sheets

(51) Int. Cl.
*H04W 48/10* (2009.01)
*H04W 72/04* (2009.01)
*H04W 84/04* (2009.01)

(56) References Cited

U.S. PATENT DOCUMENTS

| | | | | |
|---|---|---|---|---|
| 8,126,477 B2* | 2/2012 | Dravida et al. | ........ | H04W 24/00 455/456.3 |
| 8,271,188 B2* | 9/2012 | de Koning | ............ | G01C 21/30 701/409 |
| 8,364,148 B2* | 1/2013 | Dravida | ................ | H04W 60/00 455/435.2 |
| 8,396,484 B2* | 3/2013 | Johnson | ................ | H04W 4/029 455/456.1 |
| 8,565,509 B2* | 10/2013 | Takahashi et al. | ........... | 382/145 |
| 8,639,266 B2* | 1/2014 | Zelinka | ................ | H04W 4/023 455/456.1 |
| 9,001,682 B2* | 4/2015 | Kovvali | ................ | H04W 88/18 370/252 |
| 9,008,667 B2* | 4/2015 | Jung | .............. | H04W 36/00835 455/437 |
| 9,143,995 B2* | 9/2015 | Okmyanskiy | ..... | H04W 36/0083 |
| 9,144,107 B2* | 9/2015 | Dravida | ................ | H04W 84/18 |
| 9,247,392 B2* | 1/2016 | Raghupathy | ............ | G01S 19/42 |
| 9,332,518 B2* | 5/2016 | Bojeryd | ................ | H04W 60/00 |
| 9,338,783 B2* | 5/2016 | Wellington | ............... | H04L 1/00 |
| 9,537,954 B2* | 1/2017 | Ranasinghe et al. | ... | H04L 67/12 |
| 9,602,962 B2* | 3/2017 | Edge | ..................... | H04W 4/021 |
| 9,642,128 B2* | 5/2017 | Kim | .................... | H04W 40/246 |
| 9,661,601 B2* | 5/2017 | Fischer | ................. | H04W 64/00 |
| 9,788,211 B2* | 10/2017 | Zhang | .................... | H04M 15/44 |
| 9,924,406 B2* | 3/2018 | Yang | ..................... | H04W 16/04 |
| 10,142,779 B2* | 11/2018 | Pandharipande | ... | H04L 61/6081 |
| 10,142,919 B2* | 11/2018 | Brown | .................. | H04W 48/10 |
| 10,194,379 B2* | 1/2019 | Martin | .................. | H04W 48/16 |
| 10,672,033 B2* | 6/2020 | Kwon | ................ | G06Q 30/0267 |
| 10,701,595 B2* | 6/2020 | Bojeryd | ............ | H04W 36/0022 |
| 10,708,826 B2* | 7/2020 | Bojeryd | ............ | H04W 36/0022 |
| 10,805,867 B2* | 10/2020 | Martin | .................. | H04W 28/08 |
| 2005/0227689 A1* | 10/2005 | Jewett | .................... | H04W 64/00 455/433 |
| 2009/0233605 A1 | 9/2009 | Kim | | |
| 2014/0162685 A1* | 6/2014 | Edge | ..................... | H04W 4/023 455/456.1 |
| 2015/0208262 A1* | 7/2015 | Siomina | ................ | H04W 24/10 370/252 |
| 2015/0327127 A1* | 11/2015 | Centonza | .......... | H04W 36/0055 455/436 |
| 2016/0014665 A1* | 1/2016 | Centonza | .............. | H04W 36/30 455/436 |
| 2016/0029224 A1* | 1/2016 | Edge | ..................... | H04W 24/08 455/456.1 |
| 2016/0044591 A1* | 2/2016 | Pao | ........................ | H04W 48/12 370/329 |
| 2016/0066168 A1* | 3/2016 | Fodor | ................. | H04W 40/246 455/404.1 |
| 2016/0373970 A1* | 12/2016 | Kulal | ................ | H04W 36/0061 |

FOREIGN PATENT DOCUMENTS

| | | |
|---|---|---|
| EP | 3032883 A2 | 6/2016 |
| GB | 2507119 A1 | 4/2014 |
| WO | 2002073993 A1 | 9/2002 |

OTHER PUBLICATIONS

Nokia Siemens Networks et al: MDT operation in networks that use equivalent PLMNs and/or RAN sharing11 , 3GPP Draft; R2?113775 PLMN Usage With MDT, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Aug. 22, 2011, Aug. 16, 2011 (Aug. 16, 2011), XP050539840, [retrieved on Aug. 16, 2011] chapter 2.3 RAN sharing.

* cited by examiner

NETWORK ENTITIES, A WIRELESS COMMUNICATION SYSTEM AND A METHOD FOR COLLECTING DATA FOR MULTIPLE MOBILE NETWORK OPERATORS

FIELD OF THE INVENTION

The field of this invention relates to network entities, a wireless communication system and methods therefor and particularly to a method for collecting data for multiple mobile network operators. The field of this invention relates to enabling a presence cell to broadcast network IDs relating to multiple MNOs, e.g. on an operating frequency that is present in the associated macro neighbour list, such as for presence applications.

BACKGROUND OF THE INVENTION

Wireless communication systems, such as the 3$^{rd}$ Generation (3G) of mobile telephone standards, are well known. An example of such 3G standards is the Universal Mobile Telecommunications System (UMTS™), developed by the 3$^{rd}$ Generation Partnership Project (3GPP™) (www.3gpp.org). The 3$^{rd}$ generation of wireless communications has generally been developed to support macro-cell mobile phone communications. Such macro cells utilise high power base stations (NodeBs in 3GPP™ parlance) to communicate with wireless communication units within a relatively large geographical coverage area. Typically, mobile wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem includes one or more cells to which UEs may attach, and thereby connect to other communication units within, or through, the wireless communication system. 3GPP™ has proposed and ratified a subsequent standard: the Long Term Evolution (LTE™) standard, namely, an Evolved Universal Mobile Telecommunication System Territorial Radio Access Network, (E-UTRAN), for a mobile access network, as well as a System Architecture Evolution (SAE) solution, namely, an Evolved Packet Core (EPC), for a mobile core network.

User Equipment (UE) can access a core network through a 2G/3G Radio Access Network (RAN), such as the Enhanced Data Rate for GSM Evolution (EDGE) RAN (referred to as 'GERAN') or a UMTS™ Terrestrial RAN (referred to as 'UTRAN'), and access the EPC through the E-UTRAN. Generally, the Core Network is responsible for switching and routing voice calls and data to and from wired telephone networks or the Internet. A RAN is located between the Core Network and the UE.

Operators are seeking to exploit their radio spectrum by providing micro-location based tracking of anonymised UEs within their networks. The Operators already provide large-scale macro location insights using probes to monitor which UEs are using which macro cells. The Operators then combine this data with other data sources (such as their CRM information, billing data and the web sites that the users visit). By combining these data sets in an anonymised form they can provide valuable data insights into what type of consumer visits what areas and what their typical journeys are. These can be provided to governments and transportation providers in order to assist with planning future capacity requirements, or to aid in optimising traffic routes.

Lower power (and therefore smaller coverage area) cells are a recent development within the field of wireless cellular communication systems. Such small cells are effectively communication coverage areas supported by low power base stations. The terms 'picocell' and 'femtocell' are often used to mean a cell with a small coverage area, with the term femtocell being more commonly used with reference to residential small cells. Herein, the term 'small cell' encompasses any cell having a relatively small coverage area (i.e. a coverage area less than a typical macro cell) and includes picocells and femtocells. The low power base stations that support small cells are referred to as Access Points (APs), with the term Home Node B (HNBs) or Home E-UTRAN Node B (HeNB) typically identifying femtocell access points. These small cells are intended to augment the wide area macrocell network and support communications to User Equipment in a restricted, for example, indoor environment. An additional benefit of small cells is that they can offload traffic from the macrocell network, thereby freeing up valuable macrocell network resources.

With the increasing use of small cell HNB type devices, instead of macro cells, the Operators can now provide location data at a much finer granularity (i.e. within a few meters). This has numerous retail applications, such as allowing a retailer to have insight into the type of people who frequent their stores (based on anonymous aggregated sightings). HNB-type devices capable of being configured to provide location information, are often referred to as a 'Presence Cells', which work much like a HNB operating in a closed-access mode. In this manner, the HNB appears like any other cell in the Operator's network, in terms of UE reselection behaviour. A standard Presence Cell is configured to collect location-related data, but is provisioned to a single Mobile Network Operator (MNO). Therefore, it only captures data from the Operator that it is provisioned to, plus any roaming traffic allowed on that frequency (e.g. international and national roaming devices, where allowed). The Presence Cell would first ask UEs trying to access it for their unique identity, and would then reject the UE back to the normal macro network. This can then provide a timestamp, UE identity and rough location information (based on the fact that the coverage area of the Presence Cell is relatively small).

Figure 1:
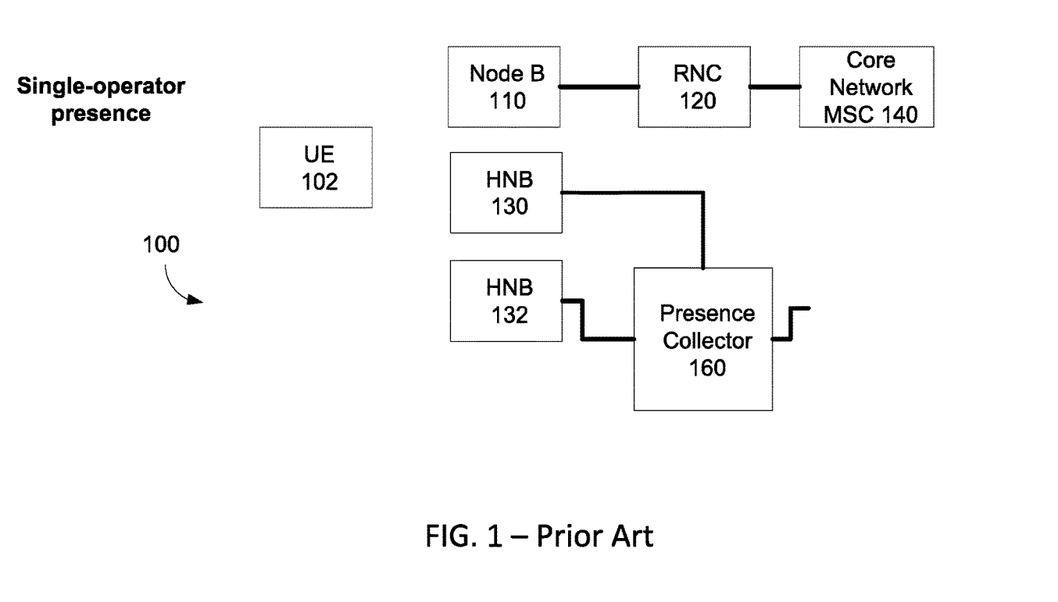
FIG. 1 illustrates a known single operator wireless communication system comprising a macro cell base station and small cell access points and a presence collector.

Referring now to FIG. 1, an example of part of a 3G wireless communication system is illustrated and indicated generally at 100. Here, the core network, represented by a single RAN MSC 140 is operated by a single Operator. The MSC 140 has a link to a RAN subsystem over the so-called Iu interface. The RAN subsystem includes a radio network controller (RNC) 120 coupled to respective macro cell NodeB 110 that supports wireless communications in a macro cell.

The RAN subsystem, in this illustration, also comprises two small cell Access Points comprising Home Node Bs (HNBs) 130, 132, using different Area Codes to the macro cell NodeB 110. The HNBs 130, 132 provide a wireless link to one or more User Equipment (UE) 102 over the so-called Uu interface. The HNBs 130, 132 provide wireless coverage over a relatively small area, e.g. a femtocell. An example of a typical HNB for use within a 3GPP™ 3G system may comprise Node-B functionality and some aspects of RNC functionality, as specified in 3GPP TS 25.467.

The operating frequency and physical cell identities (PCIs) of the HNBs 130, 132 are preferably contained in the neighbour list of RNC 120, so that the UE 102 will be guided to reselect to one of the HNBs 130, 132, as it moves within its respective coverage range. When the UE 102 attempts to register to the HNB, the HNB will gather the UE identity and then reject it, so that the UE returns to the macro cell NodeB 110.

A Presence collector 160 is coupled to HNBs 130, 132 and aggregates the UE sightings information, obtained from each Presence Cell (e.g. HNB 130, 132 when configured for presence services) and routes the relevant sightings data to the Operator for further down-stream processing. In the field of presence cells, it is known that a HNB or similar device may be used as the basis of a presence service, gathering user identities that are relayed to Presence Collector 160. It is also known that multiple presence cells can be deployed to serve respective different operators; or to provide presence detection on different RAN technologies, for example 3G UMTS™ and 4G LTE™.

In a variation of the operation of the communication system of FIG. 1, the HNBs 130, 132 also provide access to normal mobile network services to the UE 102, using the so-called Iuh interface to a Home Node B Gateway (HNB-GW), which in turn is connected to the MSC 140 of the Core Network. The UE 102 may roam in and out of the coverage areas of the Node B 110, or the coverage area of the HNB's 130, 132, and request access to the Core Network through any one of these access nodes. The MSC 140 of the Core Network routes services for both the small cell and macro cell networks of FIG. 1. Thus, the UE 102 roams between a coverage area of the macro cell network and the coverage areas of the small cell network, with each network utilising the same MSC 140 of the Core Network. The MSC 140 is aware of the location area codes (LACs) for the areas covered by the Node B 110 and the HNBs 130, 132. In addition to providing mobile network services, the HNBs 130, 132 also relay UE sightings to the Presence Collector 160.

In order to use network resources more efficiently, it is known for multiple Core Networks belonging to different Operators to share a common RAN, referred to as a Multi-Operator Core Network (MOCN). The design goal of a MOCN is that the RAN broadcasts multiple public land mobile network (PLMN) Identities (IDs), and UEs can request to attach/update to the identity that they see as the most appropriate (which would typically be their Home PLMN in their home country). A PLMN is any wireless communications system intended for use by terrestrial subscribers, in vehicles or on foot. Such a system can stand alone, but often it is interconnected with a fixed system, such as the public switched telephone network (PSTN). Here, as shown, the standard 3GPP™ MOCN capability is for a cell (e.g. HNB 132) to simultaneously broadcast multiple PLMNs on a common broadcast channel (F1), per the 3GPP™ standards. Thus, the RAN broadcasts Multiple PLMN IDs in the Multiple PLMN List information element (IE) of the Master Information Block (MIB), as described in the 3GPP 25.331 radio resource control (RRC) specification Release 6. UEs from any of the PLMNs may access the cell on the common channel (F1), identifying which PLMN ID they want to connect to. The RAN will route the service request to the appropriate Core Network based on the PLMN ID. Those UEs conforming to earlier 3GPP™ specifications only interpret the original 'PLMN Identity' IE that is broadcast by the network in the MIB. In the MOCN specification, this is termed the Common PLMN, and for the MOCN operation to work correctly, all sharing Operators must configure the Common PLMN into their networks and UEs.

A problem with known architectures using known single-PLMN ID presence cells is that cells are deployed on a per MNO basis, e.g. an estate of presence cells with associated presence management and a presence collector deployed by, and operated, on a per MNO basis. A problem with known architectures using known multi-PLMN ID (MOCN) presence cells, where the existing macro RAN is not shared, is that for UEs to reselect to these presence cells, after being served on the macro cell or another small cell, the operating frequency of the presence cell must be present in the neighbour cell list of each macro Node B 110 of each Operator. This is problematic when using a frequency that is shared by different PLMNs since this requires logistical coordination between all Operators in a multi-Operator scenario to ensure that each Operator's macro NodeBs and eNodeBs broadcast the shared frequency and scrambling code or PCI code neighbour relationship in their cell planning neighbour cell lists. Furthermore the requirement to use a single shared frequency is disadvantageous to those Operators not already using that frequency in their networks. A further problem with a system that supports MOCN, is that only UEs conforming to 3GPP™ Release 6 or later support decoding of multiple PLMN-IDs. This can be resolved by the use of a 'Common PLMN', as identified above, but that requires the use of Equivalent PLMN-IDs to be used in the Core Networks, which adds complexity.

Thus, a need exists for an improved method and apparatus for UEs to reselect to presence cells, which provides location-related data and which mitigates the aforementioned disadvantages.

SUMMARY OF THE INVENTION

Aspects of the invention provide a method for at least one service provider to collect mobile handset location related data for MNOs, a presence cell management entity, a base station and a communication system as described in the appended claims.

In a first aspect of the invention, a method for at least one service provider to collect wireless communication unit location-related data for multiple mobile network operators, MNOs, is described. The method comprises, at a base station supporting multiple MNOs: broadcasting on a first frequency only a first public land mobile network identifier, PLMN-ID, of a first MNO at a first instant in time for detection by first wireless communication units associated with the first MNO; receiving location related information from the first wireless communication units associated with the first MNO in response to the broadcast first PLMN-ID; broadcasting on a second frequency only a second PLMN-ID of a second MNO, at a second instant in time for detection by second wireless communication units associated with the second MNO; and receiving location-related information from the second wireless communication units associated with the second MNO in response to the broadcast second PLMN-ID.

In an optional example, the method may further comprise, time-multiplexing an air-interface broadcasting resource; and allocating individual respective time periods for broadcasting the at least first PLMN-ID and second PLMN-ID.

In an optional example the method may further comprise supporting presence services for the first and second MNOs associated with the broadcast of first and second PLMN-IDs for respective non-overlapping proportions of time.

In an optional example, allocating individual respective time periods for broadcasting the at least first PLMN-ID and second PLMN-ID may comprise allocating a fixed time schedule for broadcasting the at least first PLMN-ID and second PLMN-ID, and in some examples the fixed time may be based on an unequal fixed time schedule for the at least first PLMN-ID and second PLMN-ID.

In an optional example, allocating individual respective time periods for broadcasting the at least first PLMN-ID and second PLMN-ID may comprise allocating a time schedule with randomisation, such that over time each MNO receives sightings covering different parts of a day.

In an optional example, allocating individual respective time periods for broadcasting the at least first PLMN-ID and second PLMN-ID may comprise allocating a time schedule that is presence-sighting dependent by switching to another PLMN-ID earlier than planned in response to capturing a number, N, of presence sightings.

In an optional example, allocating individual respective time periods for broadcasting the at least first PLMN-ID and second PLMN-ID may comprise allocating the at least first PLMN-ID on a first technology and allocating the at least second PLMN-ID on a second technology.

In an optional example, the method may further comprise repetitively broadcasting the at least first PLMN-ID and second PLMN-ID on a cyclical basis.

In an optional example, the method may further comprise storing time-scheduled data for broadcasting multiple PLMN-IDs and user-specific data relating to Presence services supported by the base station.

In an optional example, the method may further comprise selecting frequency and at least one related parameter for each PLMN ID that is broadcast, to align with an entry in a neighbour cell list of overlapping macro cells. In some examples, where the base station supports third generation communications, the at least one related parameter comprises a scrambling code, and where the base station supports fourth generation communications, the at least one related parameter comprises a physical cell identity, PCI.

In an optional example, where the at least one base station is coupled to a presence collector, the method may further comprise receiving and processing presence sighting information for multiple Network Operators; forwarding the presence sighting information to a presence collector coupled to the at least one base station for routeing to the relevant Network Operator's data analytics system, or forwarding the presence sighting information to the relevant Network Operator's data analytics system direct.

In an optional example, obtaining presence sighting information may comprise: receiving a mobile handset identity; and extracting a first subset of digits of the mobile handset's identity to derive a home PLMN, HPLMN of the mobile handset; or using an address of a target PLMN provided by the mobile handset. In some examples, at the base station, the method may further include applying an Operator-specific hash function to obscure the mobile handset identity and forwarding the hashed mobile handset identity to the at least one Network Operator.

In an optional example, the mobile handset identity used for presence service may be one from a group comprising: an International mobile subscriber identity, IMSI, temporary mobile subscriber identity, TMSI or in the case of LTE™, a Globally Unique Temporary ID, GUTI.

According to a second aspect of the invention, a base station supporting presence cell comprises: a transceiver comprising a transmitter and a receiver; and a controller operably coupled to the transceiver. The controller is configured to: broadcast on a first frequency only a first public land mobile network identifier, PLMN-ID, of a first mobile network operator, MNO, at a first instant in time from the transmitter for detection by first wireless communication units associated with the first MNO; and receive location related information from the first wireless communication units associated with the first MNO in response to the broadcast first PLMN-ID. The controller is further configured to: broadcast on a second frequency only a second PLMN-ID of a second MNO, at a second instant in time from the transmitter for detection by second wireless communication units associated with the second MNO; and receive location related information from the second wireless communication units associated with the second MNO in response to the broadcast second PLMN-ID.

According to a third aspect of the invention, a presence cell management entity is operably coupled to a presence collector, configured to obtain data from at least one base station, and coupled to a plurality of presence servers. The presence cell management entity comprises: a controller configured to define a parameter set for different mobile network operators; a scheduler, operably coupled to the controller and configured to set a time-multiplexing schedule of available frequencies for supporting multiple mobile network operators; and a transceiver configured to send the parameter set and the schedule to at least one base station for use when supporting multiple mobile network operators.

In an optional example, the controller may be further configured to select a frequency and at least one related parameter for each mobile network operator identifier that is broadcast to the at least one base station, in order to align with an entry in a neighbour cell list of overlapping macro cells for the at least one base station to use. In an optional example, the parameter set may include a plurality of parameter values including at least one from a group of: a public land mobile network, PLMN, identifier of a mobile network operator, an operating frequency, a permitted area identifier, a physical cell identity, a list of available frequencies, a range of Area identifiers.

According to a fourth aspect of the invention, a wireless communication system comprises at least one base station, at least one wireless communication unit and at least one mobile network operator. The base station, supporting multiple MNOs, is configured to: broadcast on a first frequency only a first public land mobile network identifier, PLMN-ID, of a first mobile network operator, MNO, at a first instant in time for detection by first wireless communication units associated with the first MNO; and receive location related information from the first wireless communication units associated with the first MNO in response to the broadcast first PLMN-ID. The controller is further configured to: broadcast on a second frequency only a second PLMN-ID of a second MNO, at a second instant in time for detection by second wireless communication units associated with the second MNO; and receive location related information from the second wireless communication units associated with the second MNO in response to the broadcast second PLMN-ID.

These and other aspects, features and advantages of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The inventors have recognised that, for many applications, using a presence Cell to obtain presence 'statistically significant' sample data is desirable. Consequently, in most applications with multiple mobile network operators (MNOs), it is more beneficial for the (or multiple) presence cell(s) to collect a subset of data for each MNO for a percentage of the time, rather than be limited to collecting data for only one operator (MNO) all of the time. Thus, examples of the invention propose a time-multiplexed mechanism for one or more presence cell(s) to support multiple PLMNs, but only broadcast a single PLMN-ID at any particular instant in time. This is in contrast to a known use of conventional MOCN, whereby the multiple Network Operators agree to a network-sharing agreement and the cells broadcast the different PLMN IDs of the multiple operators at the same time, while also broadcasting in some cases a 'Common PLMN' to ensure compatibility with UEs older than 3GPP Release 6. In some examples, the presence cell(s) may be configured to support multiple PLMNs, and with each PLMN using an operating frequency that is present in an associated macro NodeB neighbour cell list. Examples of the invention describe a mechanism whereby each PLMN-ID is broadcast for a time-limited period of time, and, hence, presence services for that MNO associated with the broadcast PLMN-ID will also only be operational for a proportion of the time.

In some examples, a Presence cell management entity is provided that defines a parameter set and sets a time-multiplexing schedule for use of the available frequencies for use by HNBs supporting multiple PLMNs.

In particular, in some examples, a mechanism is described for HNBs to switch to an operating frequency that matches an entry in the macro neighbour lists of the corresponding Operator when the PLMN-ID is switched. Such an approach may advantageously enable presence detection to successfully occur for the duration of a PLMN-ID broadcast, without requiring co-ordination of neighbour lists and frequency usage between Operators. This is in contrast to a known use of a single shared frequency in conventional MOCN, whereby the Network Operators must come to a network-sharing agreement that is applied to all of their macro cells. Furthermore, this is an attractive and less expensive alternative to deploying multiple Presence Cells, per-Operator, and an associated back-end network and management infrastructure.

Although examples of the invention are described with regard to a 3GPP™ implementation for 3G devices, it is envisaged that in other examples the time-limited broadcast PLMN-ID concepts herein described may be extended in various ways to apply to other technologies such as LTE™. In some examples, the time-limited broadcast PLMN-ID concepts herein described may be applied to existing UEs as well as for new UEs that are, say, compliant with the LTE™ standard (and where there are no such legacy UEs).

Examples of the invention are described with regard to service provision by a service provider. In particular, examples of the invention are described with reference to a mobile network operator service provider. However, it is envisaged in other examples the concepts could be employed by other service providers, such as an independent presence service provider.

Those skilled in the art will recognise and appreciate that the specifics of the specific examples described are merely illustrative of some embodiments and that the teachings set forth herein are applicable in a variety of alternative settings. For example, implementations within cellular communication systems conforming to different standards are contemplated and are within the scope of the various teachings described.

Figure 2:
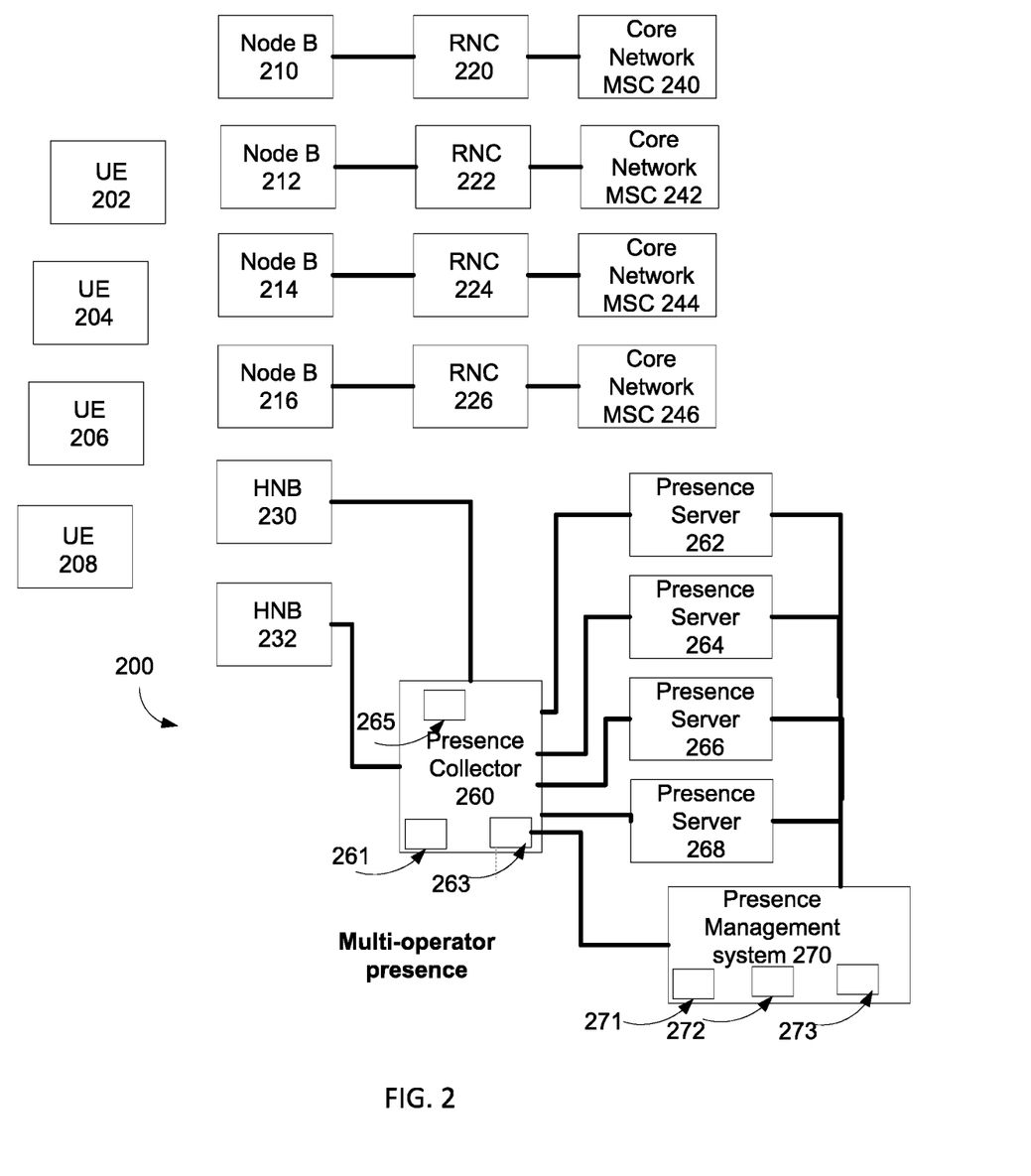
FIG. 2 illustrates a part of an example of a multi-Operator wireless communication system comprising multiple single operator core networks and a single presence collector in accordance with an example embodiment of the invention.

Referring now to FIG. 2, a part of an example wireless communication system 200 comprising multi-Operator core networks with a presence collector is illustrated in accordance with an example embodiment of the invention.

For simplicity purposes only, FIG. 2 shows four core networks, represented by four MSCs 240, 242, 244 and 246, which are operated by four different Operators. Each MSC 240, 242, 244, 246 has a link to a Radio Access Network (RAN) subsystem over the so-called Iu interface. A core network may typically comprise many network elements, but for clarity purposes only the four MSCs are shown in FIG. 2. Similarly, a typical RAN may comprise many subsystems. However, for clarity purposes only, just one RAN comprising two network elements is shown in the example of FIG. 1, namely RNCs 220, 222, 224, 226 being coupled to respective Macro cell NodeBs 210, 212, 214, 216. Thus, Macro cell Node Bs 210, 212, 214, 216 each represent separate Operator macro cell networks. UEs 202, 204, 206, 208 are subscribers of the respective separate operator networks.

In accordance with example embodiments, the RAN subsystem also comprises two Access Points (APs), comprising Home Node Bs (HNBs) 230, 232 offering Presence service and a Presence collector 260. The Presence collector 260 is provided with at least a signal processor 261, a transceiver 263 to transmit or receive information (in wireless, wireline or any other form) and optionally a database store 265, which may be in the form of separate data base stores for each MNO with relevant security provisions, amongst many other components and circuits. At any moment in time the HNBs 230, 232 broadcast a single PLMN ID associated with a particular Core Network operator. However, in examples of the invention and over a longer period, the HNBs will have broadcast the PLMN ID of multiple, or each, Core Network(s) operator for some duration, as described later with reference to FIGS. 4-7.

For example, the broadcast of PLMN IDs of each Core network may be time-multiplexed, for example by HNB 230. In one example, HNB 230 may be configured to broadcast only a first PLMN-ID, in a first operational frequency (F1) in a first time-limited period and subsequently be configured to broadcast only a second PLMN-ID in a second operational frequency (F2) in a second time-limited period, and so on. In this manner, for example, if a retailer wanted to collect presence information for UEs in its premises, and currently only has a single MNO-1 presence cell, whereas say four MNOs are operational in the country, the retailer could employ HNB 230 to operate in a time-multiplexed manner. For example, following a separate agreement with each MNO, HNB 230 may support each of MNO-1, MNO-2, MNO-3, MNO-4 on the same Presence Cell, using time-limited slots to obtain MNO specific UE-related presence data.

The HNBs 230, 232 provide a wireless link to one or more User Equipment (UE) 202, 204, 206, 208 over the so-called Uu interface. The HNBs 230, 232 provide wireless coverage over a relatively small area, e.g. a small cell, sometimes referred to as a femtocell. Thus, when in the coverage area of HNBs 230, 232, and when the HNB is broadcasting its Home PLMN, one of the UEs 202, 204, 206, 208 will consider the HNB as part of their normal Home PLMN and will access the HNB to receive service.

Thereafter, following the one or more of the UEs 202, 204, 206, 208 moving within coverage of one of HNBs 230, 232, and establishing a communication link therewith, the respective HNB 230, 232 captures the respective UE's International mobile subscriber identity (IMSI)/temporary mobile subscriber identity (TMSI) and passes the UE's IMSI/TMSI, or a hashed equivalent of the UE's IMSI/TMSI, to Presence Collector 260. In the case of LTE, a Globally Unique Temporary ID, GUTI, may be used. Thus, in some examples, the Presence Cell, in a form of respective HNB 230, 232, may have been configured to store hashing algorithms. The signal processor 261 of the Presence Collector 260 is configured to collect and correlate received information in separate data base stores 265 for each MNO with relevant security provisions. The signal processor 261 of the Presence Collector 260 then performs operator-specific processing and passes, via transceiver 263, the UE's IMSI/TMSI to a respective Presence Server 262, 264, 266, based on the UE's IMSI/TMSI or any other PLMN information provided by the HNB.

A Presence cell Management entity 270 is operably coupled to the Presence Collector 260 and each of the Presence Servers 262, 264, 266, 268. The Presence cell Management entity 270 is provided with a controller 271, operably coupled to a scheduler 273 and a transceiver 272. The controller 271 may be configured to define or provision a parameter set for different mobile network operators including one or more MNO parameter values. Furthermore, a time-multiplexing schedule of the available frequencies, for use for multiple PLMNs in HNB broadcasts, may be scheduled by the scheduler 273.

The controller 271 may also be configured to send, via transceiver 272, the parameter set and the schedule to at least one base station for use when supporting multiple mobile network operators to the base stations, e.g. HNB 230, 232. In some examples, the Presence cell Management entity 270 is software driven, such that the controller 271 of the Presence cell Management entity 270 is in charge of validating the certificates, authenticating the HNBs, UEs, Presence Servers, etc., downloading the appropriate software and provisioning the HNBs, UEs, Presence Servers, etc.

In some examples, the controller 271 may be further configured to select a frequency and at least one related parameter for each mobile network operator identifier that is broadcast to the at least one base station, in order to align the selected frequency with an entry in a neighbour cell list of overlapping macro cells for the at least one base station to use. In some examples, the parameter set comprises a plurality of parameter values including at least one from a group of: a PLMN-ID of a MNO, an operating frequency, a permitted area identifier, a physical cell identity, a list of available frequencies, a range of Area identifiers.

In some examples, the HNB 230, 232 may use a well-known sequence (such as used for IMSI-based Access Control) to obtain the IMSI of the UE before rejecting the registration in order to send the UE 202 back to the macro network. Alternatively, the HNB 230, 232 may simply capture a TMSI or GUTI (without issuing an Identity Request) and allow the Operator to post-process this to a subscriber identity at a later point.

In an optional example, the method may further comprise the Presence Collector 260: receiving the end user International Mobile Subscriber Identity (IMSI) or temporary mobile subscriber identity (TMSI); and extracting a first subset of (5-6) digits of the end user's IMSI to derive the home PLMN (HPLMN). In an optional example, the method may further comprise forwarding details of the end user's identity to the presence service to a selected Network Operator's data analytics system (e.g. presence server) based on the HPLMN.

In some examples, the HNB 230, 232 may use the UE's IMSI prefix (e.g. the first 5 or 6 digits), or the knowledge of target PLMN to determine an operator-specific hash to obscure the identity. The Presence Collector 260 may then relay the hashed identities to the appropriate Operator via the relevant respective Presence Server 262, 264, 266, 268. In some examples, the Presence Collector may be considered as an aggregator of data from lots of Presence Cells and configured to push the data onwards to Operator Analytics systems.

In an optional example, the base station may be coupled to a presence collector and the method may further comprise: receiving presence sightings for multiple Network Operators from the presence collector; and routeing the sightings information to the relevant Network Operator's data analytics system.

Figure 3:
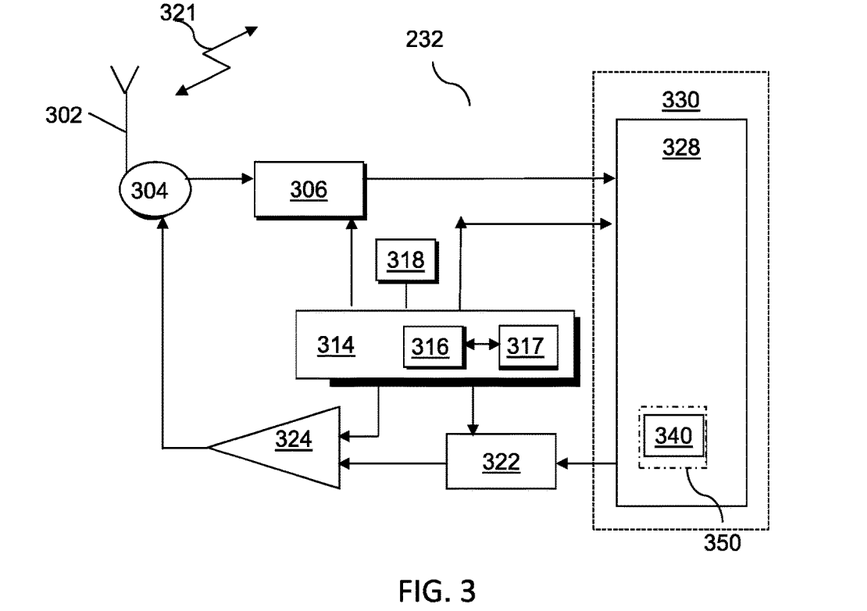
FIG. 3 illustrates an example block diagram of a base station (for example a HNB or presence cell) configured to operate in accordance with an example embodiment of the invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a wireless base station, such as a presence-configured HNB 232. The wireless base station 232 contains an antenna 302, antenna array, or plurality of antennas for receiving and transmitting signals 321 coupled to an antenna switch or duplexer 304 that provides isolation between receive and transmit chains within the base station 232. One or more receiver chains, as known in the art, include receiver front-end circuitry 306 (effectively providing reception, filtering and intermediate or base-band frequency conversion). The receiver front-end circuitry 306 is coupled to a signal processor 328 (generally realized by a digital signal processor (DSP)). A skilled artisan will appreciate that the level of integration of receiver circuits or components may be, in some instances, implementation-dependent.

A controller 314 maintains overall operational control of the base station 232. For example, the controller 314 is configured to provision itself and its broadcasts according to different MNO parameters frequency(ies), scrambling codes, offsets and other radio information. In some examples, such provisioning may occur manually, automatically on a schedule, automatically on a defined time sharing percentage over a period, or automatically on a random basis. In some examples, the broadcast provisioning may be scheduled by a Presence Cell Management Entity, such as Presence Management Entity 270 of FIG. 2.

The controller 314 is also coupled to the receiver front-end circuitry 306 and the signal processor 328. In some examples, the controller 314 is also coupled to a buffer module 317 and a memory device 316 that selectively stores operating regimes, such as decoding/encoding functions, synchronization patterns, code sequences, and the like, as well as information related to UEs that it is communicating with. In some examples, the memory device 316 may also be configured by the controller 314 to store MNO data hashing algorithms and decoding mechanisms, such that the controller 314 may ensure that they are rotated on a corresponding and appropriate schedule.

In some examples, the controller 314 may also be configured to collect and correlate the information received from UEs for each connected MNO, when configured for presence services and in some examples store the collected and/or correlated data in the memory device 316 for subsequent transfer to the presence collector.

A timer 318 is operably coupled to the controller 314 to control the timing of operations (e.g. transmission or reception of time-dependent signals) within the base station 232.

As regards the transmit chain, this essentially includes transmitter/modulation circuitry 322 and a power amplifier 324 coupled to the antenna 302, antenna array, or plurality of antennas. The transmitter/modulation circuitry 322 and the power amplifier 324 are operationally responsive to the controller 314.

In accordance with examples of the invention, base station 232 is configured such that the transmitter circuit is configured to broadcast a plurality of PLMN-IDs, notably on a time-multiplexed basis. Hence, according to the time when each PLMN-ID is broadcast, a presence service related to that PLMN-ID will only be operational for that proportion of the time, as described in some examples of FIGS. 4-6.

In particular, the base station 232 is configured to broadcast at least one allocated PLMN ID that is associated with at least one service offered by at least one mobile network operator. The proportion of time allocated to each PLMN-ID can be managed in various ways by controller 314. For example, a fixed time schedule may be employed, which in some examples need not be equal for each operator. In a second example, controller 314 may implement a time schedule with randomisation, such that over time each operator will receive sightings covering different parts of the day. In a third example controller 314 may implement a time schedule that is presence-sighting dependent, for example by switching to another PLMN-ID earlier than planned, in response to, say, N presence sightings have been captured. In this example, 'N' may be configurable and could be different for the different Operators.

In accordance with examples of the invention, memory device 316, operably coupled to the signal processor 328, may be configured to store time-scheduling data for broadcasting PLMN-IDs and user-specific data relating to Presence services supported by the HNB 232.

The signal processor 328 in the transmit chain may be implemented as distinct from the signal processor in the receive chain. Alternatively, a single processor may be used to implement a processing of both transmit and receive signals, as shown in FIG. 3. Clearly, the various components within the base station 232 can be realized in discrete or integrated component form, with an ultimate structure therefore being an application-specific or design selection.

Figure 4:
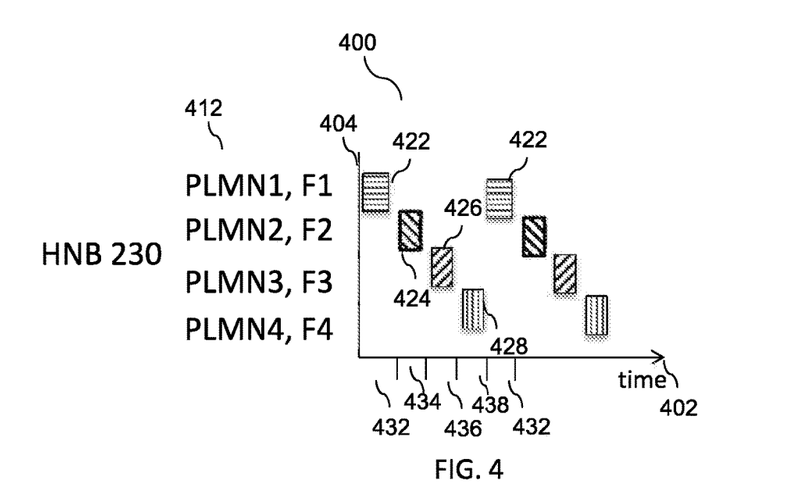
FIG. 4 illustrates a first example PLMN ID time-multiplexing scheme operating across multiple frequencies for a single presence cell in accordance with an example embodiment of the invention.

FIG. 4 illustrates a first example PLMN ID time-multiplexing arrangement 400 that is operational across multiple frequencies 404 for a single presence cell in accordance with an example embodiment of the invention. The first example PLMN ID time-multiplexing arrangement 400 uses four separate time-divided broadcast transmissions on time axis 402 for a single time-multiplexed cell, for example HNB 230 of FIG. 2. As illustrated, HNB 230 may be configured to broadcast 422 only a first PLMN-ID, e.g. PLMN-ID1 in a first operational frequency (F1) in a first time-limited period 432. HNB 230 may then be configured to broadcast 424 only a second PLMN-ID, e.g. PLMN-ID2 in a second operational frequency (F2) in a second time-limited period 434. HNB 230 may then be configured to broadcast 426 only a third PLMN-ID, e.g. PLMN-ID3 in a third operational frequency (F3) in a third time-limited period 436. HNB 230 may then be configured to broadcast 428 only a fourth PLMN-ID, e.g. PLMN-ID4 in a fourth operational frequency (F4) in a fourth time-limited period 438. In this four MNO example, the time-multiplexing arrangement would revert to the broadcasting 422 of only the first PLMN-ID again. The selection of F1, F2, F3 or F4 can be made independently for each operator, such that the frequency and other associated parameters (for example a scrambling code in 3G systems or a PCI in LTE™ systems) match an entry in the macro cell neighbour lists for that operator. This selection can be preconfigured by management, or facilitated by a Network Listen capability of the HNB to perform a scan and decode of the macro downlink broadcast channels.

In this manner, for example, if a retailer wanted to collect presence information for UEs in its premises, and currently only has a single MNO-1 presence cell, whereas say four MNOs are operational in the country, the retailer could employ HNB 230 to operate in a time-multiplexed manner. Following a separate agreement with each MNO, the HNB 230 may provide each of MNO-1, MNO-2, MNO-3, MNO-4 on the same Presence Cell, time-limited slots to obtain UE-related presence data for that specific MNO. In some examples, such data for each MNO may be varied randomly throughout the day (and across multiple days/weeks) in order to provide a more statistically fair and relevant data set. In the case of 3G networks, a further benefit of performing time multiplexing of the PLMN-ID and frequency resource, compared to the broadcast of multiple PLMNs simultaneously, is that the single PLMN-ID will be interpreted by all 3G UEs, regardless of their 3GPP release, without the need for Operators to agree upon and configure a "Common PLMN" for detection by pre-Release 6 UEs.

In other examples, fewer or more than four MNOs may be supported and the broadcast resource adapted in a time-multiplexed manner accordingly.

Figure 5:
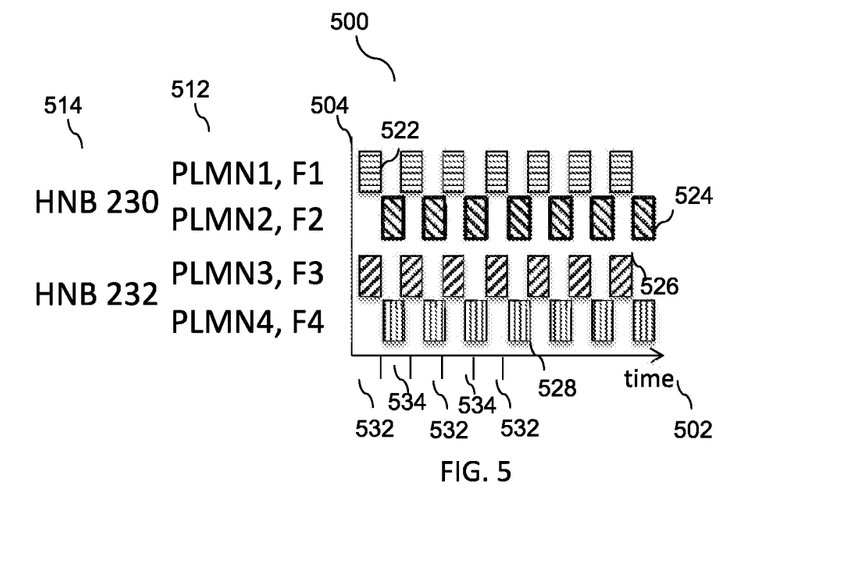
FIG. 5 illustrates a second example PLMN ID time-multiplexing scheme operating across multiple frequencies for multiple presence cells in accordance with an example embodiment of the invention.

FIG. 5 illustrates a second example PLMN ID time-multiplexing arrangement 500 that is operational across multiple frequencies for multiple frequencies 504 and multiple presence cells 514 (for example HNB 230, 232 in FIG. 2) in accordance with an example embodiment of the invention. In this example, and in order to increase the proportion of presence service available, a hybrid mode is proposed. This hybrid mode uses multiple presence cells at a location in a co-ordinated manner. The example of FIG. 5 is more cost-effective than using four separate cells, and offers a larger proportion of service per-operator than the single time-multiplexed cell of FIG. 4. In this example, HNB 230, 232 are substantially co-located (e.g. within a few metres of one another) with a common coverage area.

The second example PLMN ID time-multiplexing arrangement 500 again uses four separate time-divided broadcast transmissions on time axis 502 for multiple presence cells, for example HNB 230, 232 of FIG. 2. As illustrated, HNB 230 may be configured to broadcast 522 only a first PLMN-ID, e.g. PLMN-ID1 in a first operational frequency (F1) in a first time-limited period 532. HNB 230 may then be configured to broadcast 524 only a second PLMN-ID, e.g. PLMN-ID2 in a second operational frequency (F2) in a second time-limited period 534. Second HNB 232 may also be configured to broadcast 526 only a third PLMN-ID, e.g. PLMN-ID3 in a third operational frequency (F3) in the first time-limited period 532. HNB 232 may also be configured to broadcast 528 only a fourth PLMN-ID, e.g. PLMN-ID4 in a fourth operational frequency (F4) in a second time-limited period 534. In this four MNO example, the time-multiplexing arrangement would revert to the broadcasting 522 of only the first PLMN-ID again by the first HNB 230 and the concurrent broadcasting 526 of only the third PLMN-ID by the Second HNB 232.

Figure 6:
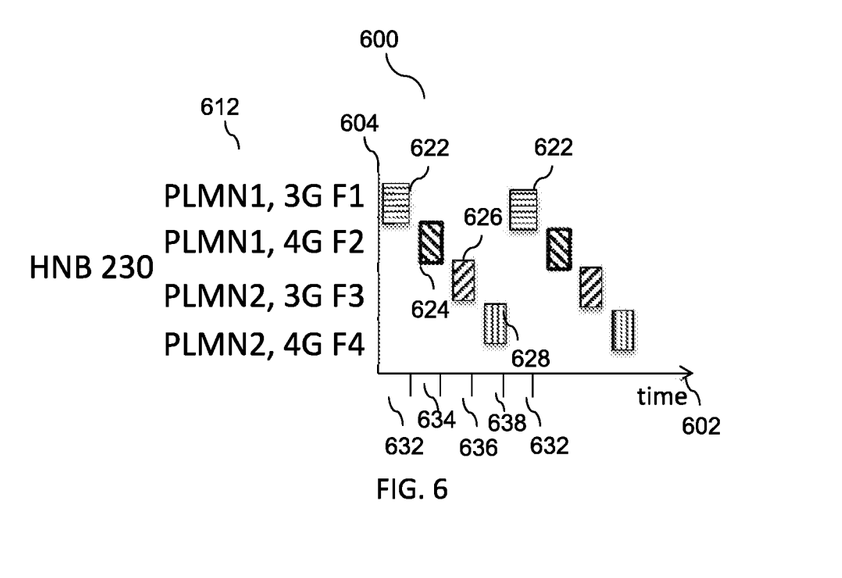
FIG. 6 illustrates a third example PLMN ID time-multiplexing scheme operating across multiple frequencies and multiple technologies for a single presence cell in accordance with an example embodiment of the invention.

FIG. 6 illustrates a third example PLMN ID time-multiplexing arrangement 600 that is operational across multiple frequencies and multiple technologies for a single presence cell in accordance with an example embodiment of the invention. In this time-multiplexed example, the presence cell may be configured to switch between technologies, as well as PLMN IDs. In this illustrated example, a single presence cell may be used to provide presence detection across two technologies for each of two PLMN IDs, for example by time-multiplexing two RAN technologies (e.g. 3G and 4G), as well as PLMN Operating-frequency combinations.

The third example PLMN ID time-multiplexing arrangement 600 uses four separate time-divided broadcast transmissions on time axis 602 for a single time-multiplexed cell, for example HNB 230 of FIG. 2. As illustrated, HNB 230 may be configured to broadcast 622 only a first PLMN-ID, e.g. PLMN-ID1 in a first operational frequency (F1) on a first technology, e.g. 3G, in a first time-limited period 632. HNB 230 may then be configured to broadcast 624 only the first PLMN-ID, e.g. PLMN-ID1 in a second operational frequency (F2) on a second technology, e.g. 4G, in a second time-limited period 634. HNB 230 may then be configured to broadcast 626 only a second PLMN-ID, e.g. PLMN-ID2 in a third operational frequency (F3) on the first technology, e.g. 3G, in a third time-limited period 636. HNB 230 may then be configured to broadcast 628 only the second PLMN-ID, e.g. PLMN-ID2 in a fourth operational frequency (F4) on the second technology, e.g. 4G, in a fourth time-limited period 638. In this single MNO supporting two RAN technologies example, the time-multiplexing arrangement would revert to the broadcasting 622 of only the first PLMN-ID on the first technology, e.g. 3G, again.

Thus a further benefit of performing time multiplexing of PLMN-ID and frequency is that the single PLMN-ID will be interpreted by all 3G UEs, thus allowing presence detection of all 3G UEs, and separately interpreted by all 4G UEs, thus allowing presence detection of all 4G UEs.

A skilled artisan will appreciate that there are many mechanisms available to the HNB for the different HNBs to employ different broadcast patterns and/or schedules. The presence data collection for multiple PLMNs may be carried out using different approaches to time slice the presence resource, thereby allowing the presence cell to service all of multiple PLMNs. The various examples for time multiplexing the presence resource may be applied to a large section of diverse mobile operator consumer population that is located in a deployment area, in order to service all or multiple PLMNs and provide better indication of footfall, including for old (pre 3GPP™ release 6) mobiles. For old mobiles (e.g. release 5 UEs) it is envisaged that the HNB broadcasts may be scheduled by the scheduler 273 of Presence cell management entity 270 of FIG. 2, or detected via a self-optimising network (SON), based on a determined percentage of 3GPP release 5 UEs that are active in a particular location. The time multiplexed collection approach of the concepts herein described may also be applied to latest generation of 4G mobiles, as well as future generation mobiles.

Although, some examples of the inventive concept find applicability in a wireless communication system comprising multiple operators sharing a common radio access network, it is envisaged that some examples of the inventive concept also find applicability in a wireless communication system comprising a single operator, for example by switching a cell between technologies to detect UEs served by the same PLMN but using different RAN technologies, as described with reference to FIG. 7.

Figure 7:
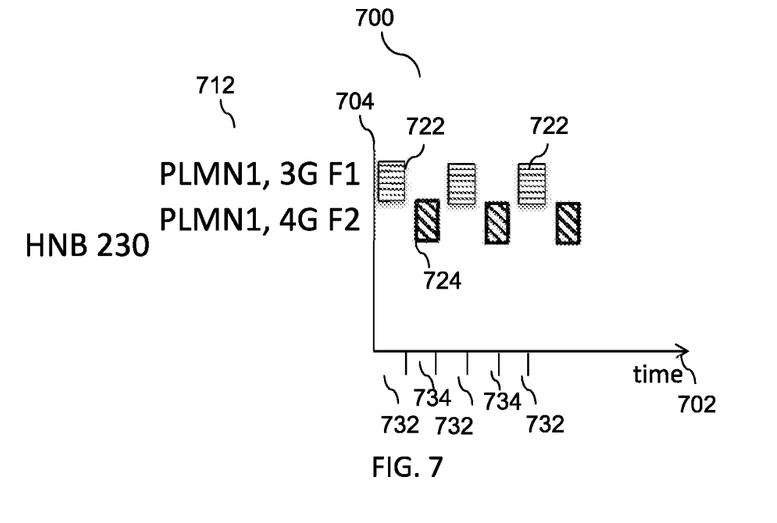
FIG. 7 illustrates a fourth example of a time-multiplexing scheme that is operational across multiple frequencies and multiple technologies for a single presence cell, in accordance with an example embodiment of the invention.

FIG. 7 illustrates a fourth example time-multiplexing arrangement 700 that is operational across multiple frequencies and multiple technologies for a single presence cell in accordance with an example embodiment of the invention. Unlike FIG. 6, in this time-multiplexed example, the presence cell also supports switching between technologies, but not PLMN IDs. In this illustrated example, a single presence cell may be used to provide presence detection across two technologies, for example by time-multiplexing two RAN technologies (e.g. 3G/4G), as well as operating-frequency combinations.

The fourth example time-multiplexing arrangement 700 uses two separate time-divided broadcast transmissions on time axis 702 for a single time-multiplexed cell, for example HNB 230 of FIG. 2. As illustrated, HNB 230 may be configured to broadcast 722 only a first PLMN-ID, e.g. PLMN-ID1 in a first operational frequency (F1) on a first technology, e.g. 3G, in a first time-limited period 732. HNB 230 may then be configured to broadcast 724 only the first PLMN-ID, e.g. PLMN-ID1 in a second operational frequency (F2) on a second technology, e.g. 4G, in a second time-limited period 734. In this single MNO supporting two RAN technologies example, the time-multiplexing arrangement would revert to the broadcasting 722 of only the first PLMN-ID on the first technology, e.g. 3G, again, and so on.

Thus, a further benefit of performing time multiplexing of frequencies and technologies is that the single PLMN-ID will be interpreted by all 3G UEs, thus allowing presence detection of all 3G UEs, and separately interpreted by all 4G UEs, thus allowing presence detection of all 4G UEs.

Figure 8:
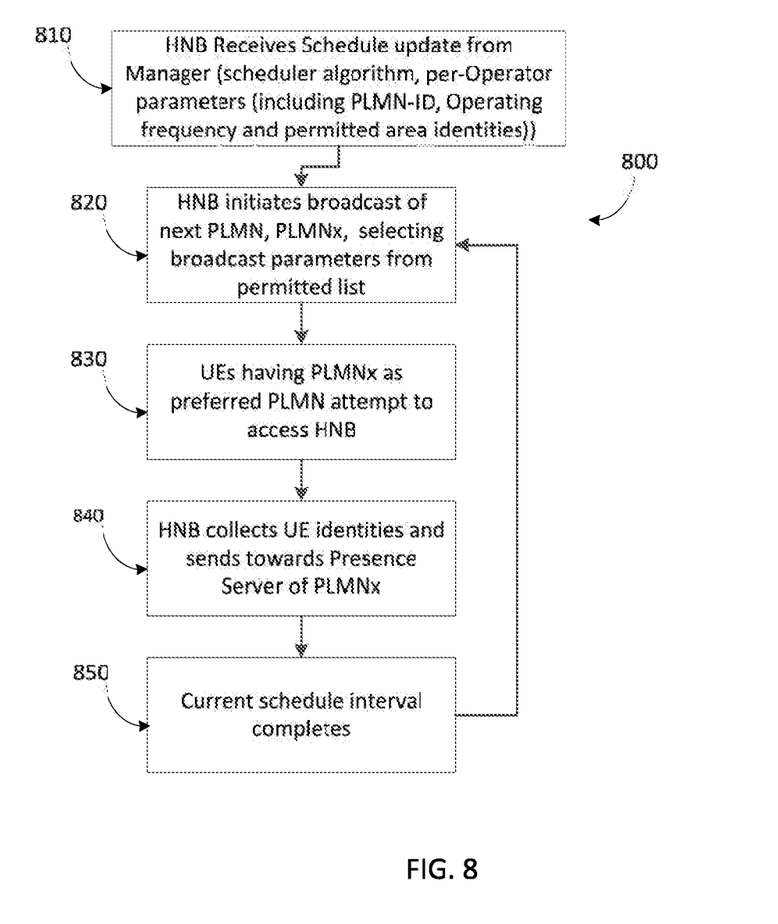
FIG. 8 is a simplified flowchart of an example embodiment of a method of PLMN ID time-multiplexing in a wireless communication system.

Referring now to FIG. 8, a simplified flowchart 800 of an example embodiment of a method of PLMN ID time-multiplexing in a wireless communication system is illustrated. At 810 Presence cell management entity may specify explicit parameter values (e.g. PLMN-ID, operating frequency, permitted area IDs, etc.) for the base station (e.g. HNB 232 of FIG. 2) to use, or may provide a permitted range or list for some parameters, such as a list of frequencies or a range of Area IDs. These parameter values are sent to the base station. At 820, where a permitted range is provided, the base station initiates a broadcast of the next PLMN, e.g. selecting randomly or cyclically from broadcast parameters from a permitted list received from the Presence cell management entity. Alternatively, in some examples, the base station may initiate a broadcast of the next PLMN by adapting to the local radio environment or current radio usage by the UEs. The base station may include a Network Listen receiver that allows it to detect overlapping macro cells and decode their neighbour lists. In this manner, the Presence cell management entity may select an operating frequency, to align, match or correspond to an entry in the macro neighbour list, in order to improve the likelihood that UEs being served by the macro cell will attempt to access the base station.

At 830, the UEs that have the broadcast PLMN-ID as their preferred (or home) PLMN-ID attempt to access the base station and, by doing so, send in their UE IDs. At 840 the base station collects the UE identities and sends these to the Presence server associated with the broadcast PLMN-ID. In some examples, the respective base station (e.g. HNB 230, 232) may capture the respective UE's International mobile subscriber identity (IMSI)/temporary mobile subscriber identity (TMSI) or Globally Unique Temporary Identity (GUTI) and pass the UE's IMSI/TMSI/GUTI or a hashed equivalent of the UE's IMSI/TMSI/GUTI to a Presence Collector, such as Presence Collector 260 of FIG. 2. In this example, the Presence access point(s)/base station(s) in a form of respective HNB 230, 232 has/have been configured to store hashing algorithms parameters for each respective MNO. At 850, the current schedule interval for that PLMN-ID is complete and the process loops to 820.

The signal processing and controller functionality of the embodiments of the invention, particularly the function of the controller 314, may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method for at least one service provider to collect wireless communication unit location related data for multiple mobile network operators, MNOs, the method comprising, at a base station supporting multiple MNOs:
   time-multiplexing an air-interface broadcasting resource;
   allocating a time schedule comprising individual respective time periods for broadcasting at least a first public land mobile network identifier, PLMN-ID of a first MNO and a second PLMN-ID of a second MNO;
   broadcasting on a first frequency only the first PLMN-ID at a first instant in time for detection by first wireless communication units associated with the first MNO;
   receiving location related information from the first wireless communication units associated with the first MNO in response to the broadcast first PLMN-ID;
   broadcasting on a second frequency only the second PLMN-ID, at a second instant in time for detection by second wireless communication units associated with the second MNO; and
   receiving location related information from the second wireless communication units associated with the second MNO in response to the broadcast second PLMN-ID;
   wherein the time schedule is presence-sighting dependent by switching to another PLMN-ID earlier than planned in response to capturing a number of presence sightings.

2. The method of claim 1, further comprising supporting presence services for the first and second MNOs associated with the broadcast of first and second PLMN-IDs for respective non-overlapping proportions of time.

3. The method of claim 1, wherein allocating individual respective time periods for broadcasting the at least first PLMN-ID and second PLMN-ID comprises one of the following:
   allocating a fixed time schedule for broadcasting the at least first PLMN-ID and second PLMN-ID;
   allocating a time schedule with randomization, such that over time each MNO receives sightings covering different parts of a day.

4. The method of claim 3, further comprising allocating an unequal fixed time schedule for broadcasting the at least first PLMN-ID and second PLMN-ID.

5. The method of claim 3, further comprising storing time-scheduled data for broadcasting multiple PLMN-IDs and user-specific data relating to Presence services supported by the base station.

6. The method of claim 3, further comprising: selecting frequency and at least one related parameter for each PLMN ID that is broadcast to align with an entry in a neighbor cell list of overlapping macro cells.

7. The method of claim 6, wherein the base station supports third generation communications and the at least one related parameter comprises a scrambling code, or the base station supports fourth generation communications and the at least one related parameter comprises a physical cell identity, PCI.

8. The method of claim 1, wherein allocating individual respective time periods for broadcasting the at least first PLMN-ID and second PLMN-ID comprises allocating the at least first PLMN-ID on a first technology and allocating the at least second PLMN-ID on a second technology.

9. The method of claim 1, further comprising repetitively broadcasting the at least first PLMN-ID and second PLMN-ID on a cyclical basis.

10. The method of claim 1, further comprising:
    receiving and processing presence sighting information for multiple MNOs; and
    forwarding the presence sighting information to a presence collector coupled to the base station for routing to a relevant MNO's data analytics system, or
    forwarding the presence sighting information to a relevant MNO's data analytics system direct.

11. The method of claim 10, wherein obtaining presence sighting information comprises one of:
    receiving a mobile handset identity; and extracting a first subset of digits of the mobile handset's identity to derive a home PLMN, HPLMN of the mobile handset;
    using an address of a target PLMN provided by the mobile handset.

12. The method of claim 11, further comprising, at the base station, applying an Operator-specific hash function to obscure the mobile handset identity and forwarding the hashed mobile handset identity to the at least one Network Operator.

13. The method of claim 11, whereby the mobile handset identity used for presence service is one from a group comprising: an International mobile subscriber identity, IMSI, a temporary mobile subscriber identity, TMSI, a globally unique temporary identity, GUTI.

14. A base station supporting presence cell comprising:
a transceiver comprising a transmitter and a receiver; and
a controller operably coupled to the transceiver and configured to:
time-multiplex an air-interface broadcasting resource;
allocate a time schedule comprising individual respective time periods for broadcasting at least a first public land mobile network identifier, PLMN-ID of a first mobile network operator, MNO and a second PLMN-ID of a second MNO;
broadcast on a first frequency only the first PLMN ID at a first instant in time from the transmitter for detection by first wireless communication units associated with the first MNO; and
receive location related information from the first wireless communication units associated with the first MNO in response to the broadcast first PLMN-ID;
wherein the controller is further configured to:
broadcast on a second frequency only the second PLMN-ID of a second MNO, at a second instant in time from the transmitter for detection by second wireless communication units associated with the second MNO; and
receive location related information from the second wireless communication units associated with the second MNO in response to the broadcast second PLMN-ID;
wherein the time schedule is presence-sighting dependent by switching to another PLMN-ID earlier than planned in response to capturing a number of presence sightings.

15. A presence cell management entity operably coupled to a presence collector configured to obtain data from a base station, and coupled to a plurality of presence servers, the presence cell management entity comprising:
a controller configured to define a parameter set for different mobile network operators;
a scheduler, operably coupled to the controller and configured to set a time-multiplexing schedule of available frequencies of an air-interface broadcasting resource for supporting multiple mobile network operators; and
a transceiver configured to send the parameter set and the schedule to at least one base station for use when supporting multiple mobile network operators wherein the schedule comprises individual respective time periods for the base station to broadcast at least a first public land mobile network identifier, PLMN-ID of a first mobile network operator, MNO and a second PLMN-ID of a second MNO and wherein the schedule is presence-sighting dependent to enable the base station to switch to another PLMN-ID earlier than planned in response to capturing a number of presence sightings.

16. The presence cell management entity of claim 15, wherein the controller is further configured to select a frequency and at least one related parameter for each mobile network operator identifier that is broadcast to the base station to align with an entry in a neighbor cell list of overlapping macro cells for the base station to use.

17. The presence cell management entity of claim 15 wherein the parameter set comprises a plurality of parameter values including at least one from a group of: a public land mobile network, PLMN, identifier of a mobile network operator, an operating frequency, a permitted area identifier, a physical cell identity in a fourth generation communication system, a scrambling code in a third generation communication system, a list of available frequencies, a range of Area identifiers.

18. A wireless communication system comprising at least one base station, at least one wireless communication unit and at least one mobile network operator, wherein a controller of the base station supporting multiple MNOs is configured to:
time-multiplex an air-interface broadcasting resource;
allocate a time schedule comprising individual respective time periods for broadcasting at least a first public land mobile network identifier, PLMN-ID of a first mobile network operator, MNO and a second PLMN-ID of a second MNO;
broadcast on a first frequency only the first PLMN ID at a first instant in time for detection by first wireless communication units associated with the first MNO; and
receive location related information from the first wireless communication units associated with the first MNO in response to the broadcast first PLMN-ID;
wherein the controller is further configured to:
broadcast on a second frequency only the second PLMN-ID, at a second instant in time for detection by second wireless communication units associated with the second MNO; and
receive location related information from the second wireless communication units associated with the second MNO in response to the broadcast second PLMN-ID;
wherein the time schedule is presence-sighting dependent by switching to another PLMN-ID earlier than planned in response to capturing a number of presence sightings.

* * * * *